April 25, 1961
D. S. HOFFENBERG
2,981,758
PREPARATION OF HALOGENATED ALKYL-VINYL AROMATIC COMPOUNDS
Filed April 2, 1959
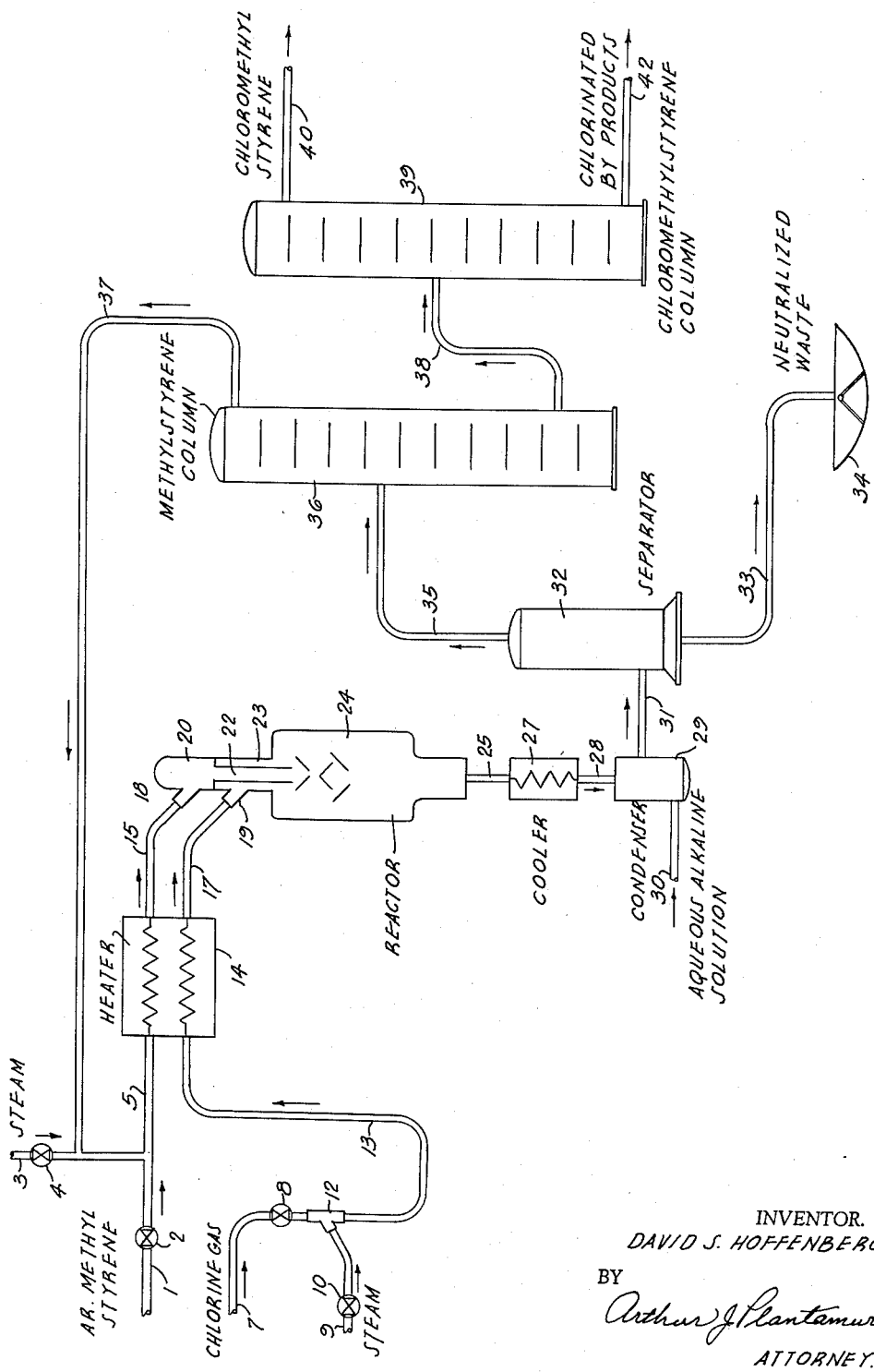
INVENTOR.
DAVID S. HOFFENBERG.
BY
Arthur J. Plantamura
ATTORNEY.

United States Patent Office 2,981,758
Patented Apr. 25, 1961

2,981,758
PREPARATION OF HALOGENATED ALKYL-VINYL AROMATIC COMPOUNDS

David S. Hoffenberg, Stamford, Conn., assignor to American Cyanamid Company, New York, N.Y., a corporation of Maine Filed Apr. 2, 1959, Ser. No. 803,674

8 Claims. (Cl. 260—651)

This invention relates to a method of preparing halogenated vinyl aromatic compounds. More particularly, the invention relates to a method of preparing halogenated monomeric ar-alkyl vinyl aromatic compounds wherein a halogen atom is substituted for an alpha-hydrogen of the ar-alkyl radical. The preparation of ar-halomethylstyrene has in the past involved a cumbersome indirect procedure consisting of several steps. The halogenation of polymeric composition, e.g., halomethylation of polystyrene and the halogenation of the polymer of ar-alkyl styrenes, has been conducted heretofore and is a known procedure in the art. To the best of my knowledge, however, the halogenation of an ar-alkyl monomer wherein a halogen atom is substituted for a hydrogen on the alkyl group attached directly to the benzene ring has not heretofore been accomplished. Illustrative of procedures which have been used to prepare halogenated ar-alkyl compounds heretofore, for example, is that of the preparation of chloromethyl-styrene described in U.S. Patent 2,780,604, wherein ethyl toluene is first chlorinated in the presence of light to produce 1-chloro, 1-chloromethylphenyl ethane and the product is then dehydrochlorinated to produce chloromethylstyrene monomer. Another procedure consists in chloromethylating ethyl benzene, brominating the chloromethylated material and then dehydrobrominating the brominated compound. These procedures for preparing the monomeric material are cumbersome and expensive. They have, moreover, the disadvantage in that they afford no control or selectivity over the isomers which are produced. Illustrative of the procedure for halogenating polymeric materials is that described in U.S. Patent 2,823,201. The disadvantage in halogenating polymers is due to the substantial halogenation which takes place on the polymer backbone as well as on the aromatic nuclei of the polymer. It is also found that in halogenating polymer the attachment of more than one halogen atom on the same alkyl radical frequently takes place. Halogenated products, in which halogenation is on the polymer backbone and in which more than one halogen atom is found on the same carbon atom, are undesirable for reasons well known to those skilled in the art. For example, such compounds when used as intermediates do not afford accurate control over the course of reactions in which such halogenated vinyl aromatic polymer is employed. It is accordingly an object of the present invention to provide a method for preparing halogenated ar-alkyl substituted vinyl aromatic monomers. Other objectives and advantages will become apparent as the description of the invention proceeds.

Halogenated ar-alkyl vinyl aromatic compounds are highly desirable for a multitude of applications. Such monomers are useful as an intermediate wherein a large variety of other functional groups may be substituted for the halogen to give new vinyl monomers. They may also be used as cross-linking agents in vinyl monomer polymerizations. They are also highly useful as a comonomer in preparing a paper size in which the active halogen of the copolymer is quaternized to give hydrophilic sites to the copolymer. The halogenation of the vinyl aromatic compounds adds little to the cost of the monomeric materials which themselves are relatively inexpensive and consequently the reaction product herein produced is commercially attractive. The monomeric vinyl aromatic starting materials are well known and may be prepared by various known procedures or they may be obtained commercially. A method for the preparation of the monomer, for example, is described in an article entitled "Methylstyrenes and Dimethylstyrenes from Diarylethanes," J. K. Dixon and K. W. Saunders, described in Industrial and Engineering Chemistry, volume 46, page 652 (April 1954). According to that procedure, the starting materials, i.e., the diarylethanes, are readily synthesized from toluene or xylene with either acetylene or acetaldehyde, using an appropriate acid catalyst system such as the mercuric sulfate-sulfuric acid combination. The diarylethanes so produced are then cracked in the vapor phase to produce the monomeric compounds, using clay catalysts and short contact times.

The chlorinated ar-alkyl vinyl aromatic compound is prepared according to the invention by halogenation of the ar-alkyl vinyl aromatic in the vapor phase at relatively high temperatures in excess of 250° C. and generally in the vicinity of 500° C. The principal reaction involved in the method of the present invention is the substitution of a halogen atom for an atom of the hydrogen in the ar-alkyl vinyl aromatic molecule as illustrated by the following reaction in which chlorine is the halogen.

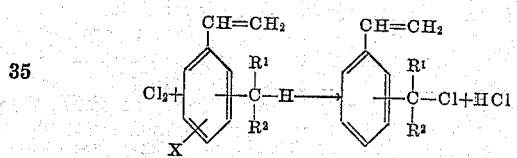

$R^1$ and $R^2$ in the above formula are substituents selected from the group consisting of hydrogen, methyl or ethyl groups and X is a substituent selected from the group consisting of hydrogen, halogen, cyano, phenyl, tertiary butyl, hydroxy, carboxy, and $OR^3$ groups wherein $R^3$ is an aryl group.

It was heretofore considered that the reaction of a halogen with an ar-alkyl vinyl aromatic compound would be one of addition at the vinyl group. This reaction wherein the halogen is added to the vinyl group does in fact take place at temperatures below about 250° C. I have now discovered that the substitution reaction wherein a halogen atom replaces a hydrogen atom on the alkyl group positioned on the aromatic ring is not only possible but may be made to take place to an extent which practically excludes the addition of halogen on the vinyl radical.

To more fully illustrate the method of the present invention, reference is made to the accompanying drawing which shows diagrammatically the preferred procedure for practicing the invention. In discussing the procedure in conjunction with the drawing, the reactants used are ar-methylstyrene and chlorine, but it will be apparent that other ar-alkyl-aromatic monomers and other halogens may be employed. As shown, ar-methylstyrene is fed through the line 1 and meter 2 and is vaporized and diluted with super-heated steam from the line 3 and meter 4, the mixture passing through the line 5 and through the oil fired tube furnace 14. Chlorine gas is introduced through the line 7, is metered at 8 and admixed with steam from line 9, metered at 10, and injected into the mixing valve 12 and the diluted chlorine thence passes through a line, separate from the aromatic-steam mixture in line 5, through the furnace 14. In the furnace 14 the reactants are heated to the reaction temperature, preferably between 400° C. and 550° C. The streams are kept separate and fed through lines 15 and 17, respectively, and are admixed in the reactor chamber 24 only when the temperature most conducive to the reaction is attained. As shown, the diluted methylstyrene from 15 passes into the reactor at 18 and into the homogenizing chamber 20 and through the tube 22, mixing with the chlorine which enters at 19 into the concentric area of the reactor entry section 23. I have found that by combining the reactants only when the proper temperature has been attained, the substitution reaction of the chlorine on the alpha-alkyl hydrogen takes place substantially to the exclusion of any addition reaction. Because the reaction progresses rapidly and the chlorine is rapidly used up in the reaction, the contact times in the reactor are not critical and periods varying from about .1 to 10 seconds may suitably be employed. A reaction time in the reactor at about 500° C. indicates that about 1.8 seconds leads to a complete reaction of all of the chlorine in the system and that longer contact times have little influence on the composition of the product obtained. The reactor product is withdrawn at 25 and fed through the cooler 27 and thence through the line 28 into the neutralizer-condenser 29. In the condenser 29 the reaction product may be mixed with an aqueous alkaline solution fed through the line 30. Suitable aqueous solutions for this purpose are solutions of sodium hydroxide or aqueous suspensions of lime, or aqueous alkaline solutions such as those of sodium carbonate and the like. The condensed reaction product is then fed through the line 31 into the separator 32, wherein the waste is withdrawn from the bottom as shown through line 33 and disposed at 34. A crude reaction product is withdrawn from the separator through line 35 and fed into the methylstyrene column 36, wherein the methylstyrene is separated from the reaction product and removed at the top as shown at line 37 and thence fed, if desired, into the ar-methylstyrene stream feed at line 5. The crude chloromethylated styrene is then withdrawn from the distillation column 36 and fed through line 38 into the second distillation or chloromethylstyrene column 39, wherein the purified chloromethylstyrene is withdrawn at the top at 40 and the chlorinated by-products, such as aryl dichloromethylstyrene, dichloromethyl ethyl benzene and trichlorinated styrenes, are separated as shown at 42. The chlorinated by-products removed at 42 are sent to storage for further processing. As noted heretofore, reaction temperatures are important and influence the course of the reaction. Temperatures varying from at least 250° C. to about 650° C. may be employed. Preferably, the reaction temperature is kept within the range of 400° C. and 550° C. Chlorine conversion within this temperature range is complete. Temperatures exceeding 650° C. may be used, but at such higher temperatures there is an increased tendency toward carbonization and consequent fouling of the system. Accordingly, it is preferred that temperatures do not exceed about 650° C. Other than maintaining an excess of the methylstyrene for practical considerations, no significant limitations are required on the mole ratios of methylstyrene to halogen employed. The mole ratio of the alkylstyrene feed to that of the halogen may be equimolar but is preferably maintained in excess, e.g., at about 1.1 to 1 to about 10 to 1 of alkylstyrene to halogen, respectively, in order to preclude the possibility (1) that excess halogen will be unused in the system and (2) that polychlorination will occur.

The following examples further illustrate the method of invention showing a practice of the invention. The examples, however, are not to be construed as limiting the scope thereof. The process described hereinabove by reference to the accompanying flow sheet, as well as the examples hereinbelow, describes the use of a diluent in admixture with the reactants. Practical processing favors the use of a diluent, although the use thereof is not indispensable. Any of the various inert gases known to the art such as water vapor, nitrogen, carbon dioxide, helium, argon and the like, may be used as diluents. The amount is not critical but generally an amount of diluent from about 10% to about 97% of the total feed may be used.

Example 1

Into a reactor maintained at 450° C. is introduced two separate gaseous streams. The organic stream contains 9 mole percent ar-methylstyrene (70% meta isomer and 30% para isomer) and 91 mole percent steam which had been preheated to 450° C. The methylstyrene-steam feed is allowed to mix at 450° C. with a second stream of chlorine similarly diluted and similarly preheated. The mole ratio of the methylstyrene to chlorine is 1.3:1 and the residence time of the reaction is 2.2 seconds. The effluent gases are condensed and scrubbed with 3% caustic solution. The organic product is washed again with dilute caustic, dried and distilled. There is obtained a 72% yield based on unrecovered methylstyrene of a mixture of 70% meta and 30% para ar-chloromethylstyrene. The boiling point of the product at 7 mm. is 94–95° C., $N_D25=1.5743$.

Example 2

The reaction and procedure as described in Example 1 is carried out using a different isomer mixture of ar-methylstyrene consisting of 67% para and 33% ortho isomers. There is obtained a 65% yield of ar-chloromethylstyrene containing 75% para and 25% ortho isomer based on the unrecovered ar-methylstyrene.

Example 3

The procedure of Example 1 is repeated using (a) nitrogen in place of the stream as diluent. The yield of ar-chloromethylstyrene is 68%. (b) Part (a) is repeated but one-half of the steam diluent is replaced by nitrogen. The yield of ar-chloromethylstryene obtained was substantially the same, i.e., 67–68%.

Example 4

The procedure and amounts of Example 1 are repeated with the exception that a like amount of bromine is used in place of chlorine. A residence time of 4 seconds is used. The yield of ar-bromomethylstyrene based on unreacted methylstyrene recovered is 60%.

Example 5

The procedure and amounts of Example 1 are substantially followed with the exception that instead of ar-methylstyrene as the organic a like amount of the reactant 3-methyl-5-tertiary butyl vinyl benzene is chlorinated. The amount of steam diluent is 80% of the total feed. The residence time is 3 seconds. The yield of 3-chloromethyl-5-tertiary butyl styrene based on the unrecovered organic reactant is 50%.

Example 6

The procedure of Example 1 is substantially repeated with the exception that the reactants are diluted (75% diluent, 25% reactant) with a 50–50 steam-nitrogen vapor and the reactant streams are not mixed until each attains a temperature of 550° C. A yield of 76% ar-chloromethylstyrene of 70% meta and 30% para isomer is obtained.

Example 7

The procedure of Example 1 is repeated with the exception that nitrogen is used as diluent for the respective streams of ar-methylstyrene and chlorine (23 mole percent diluent—77 mole percent reactant) and the diluted separate streams of organic and chlorine are preheated to a temperature of 320° C. before they are mixed in the reactor. The yield of ar-chloromethylstyrene (70% meta isomer, 30% para isomer) based on unrecovered ar-methylstyrene is 38%.

The production of monomers wherein the halogenation is effected on the ar-alkyl radical to produce a given isomer is illustrated by Examples 8-10.

Example 8

A sample of pure para-methylstyrene (2 moles) is diluted with 17 moles of steam and allowed to react with chlorine (1 mole) similarly diluted at 475° C. using a contact time of 1.1 seconds. An 83% yield (based on unrecovered para-methylstyrene) of pure para-chloromethylstyrene is obtained. The identification of the isomer is shown by infra-red analysis.

Example 9

When under the conditions used in Example 8, a sample of pure meta-methylstyrene was allowed to react with chlorine. A 81% yield of pure meta-chloromethylstyrene was obtained.

Example 10

A sample of pure ortho-methylstyrene was allowed to react with chlorine as described in Example 8. A 65% yield of pure ortho-chloromethylstyrene is obtained as shown by infra-red analysis. In this case the major side product was chloroindene which was formed in 17% yield.

I claim:

1. A method of preparing halogenated monomeric ar-alkyl vinyl aromatic compounds wherein a halogen atom is substituted for an alpha-hydrogen of the ar-alkyl radical which comprises contacting a vinyl aromatic compound of the formula

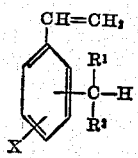

wherein $R^1$ and $R^2$ are selected from the group consisting of hydrogen, methyl or ethyl groups and X is a substituent selected from the group consisting of hydrogen, halogen, cyano, phenyl, tertiary butyl, hydroxy, carboxy, and $OR^3$ groups wherein $R^3$ is an aryl group, as a vapor with halogen gas at a temperature of between 250° C. and 650° C., condensing the organic reaction product and purifying the halogenated reaction product from by-products formed therewith by distillation.

2. A method of preparing halogenated monomeric ar-alkyl vinyl aromatic compounds wherein a halogen atom is substituted for an alpha-hydrogen of the ar-alkyl radical which comprises intermixing a vinyl aromatic compound of the formula

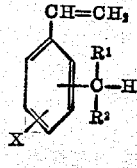

wherein $R^1$ and $R^2$ are selected from the group consisting of hydrogen, methyl or ethyl groups and X is a substituent selected from the group consisting of hydrogen, halogen, cyano, phenyl, tertiary butyl, hydroxy, carboxy, and $OR^3$ groups wherein $R^3$ is an aryl group, as a vapor admixed with diluent, with halogen gas admixed with diluent at a temperature of between 250° C. and 600° C., condensing the organic reaction product and purifying the halogenated reaction product from by-products formed therewith by distillation.

3. A method of halogenating the methyl group of ar-methylstyrene monomer wherein a halogen atom is substituted for a hydrogen atom of the ar-methyl group which comprises contacting said monomer as a vapor with halogen gas at a temperature between 400° C. and 550° C. for a period of from 0.1-10 seconds, condensing the organic reaction product and purifying the halogenated ar-methylstyrene from by-products formed therewith by distillation.

4. The method of claim 3 is which chlorine is the halogen gas and each of the gaseous reactants is admixed with an inert diluent.

5. The method of claim 4 wherein the diluent is steam.

6. The method of claim 4 wherein the diluent is nitrogen.

7. A method of halogenating the methyl group of ar-methylstyrene monomer wherein a halogen atom is substituted for a hydrogen atom of the ar-methyl group which comprises intermixing said monomer as a vapor with halogen gas at a temperature between 400° C. and 550° C. for a period of from 0.1-10 seconds, condensing the organic reaction product with an alkaline aqueous solution and purifying the halogenated ar-methylstyrene from by-products formed therewith by distillation.

8. A method of halogenating the methyl group of ar-methyl ar-tertiary butyl styrene monomer wherein a halogen atom is substituted for a hydrogen atom of the ar-methyl group which comprises contacting said monomer as a vapor with halogen gas at a temperature between 400° C. and 550° C. for a period of from 0.1-10 seconds, condensing the organic reaction product and purifying the halogenated ar-methyl ar-tertiary butyl styrene from by-products formed therewith by distillation.

References Cited in the file of this patent

UNITED STATES PATENTS

| | | |
|---|---|---|
| 2,570,022 | Boyd-Barrett et al. | Oct. 2, 1951 |
| 2,780,604 | Clarke et al. | Feb. 5, 1957 |

FOREIGN PATENTS

| | | |
|---|---|---|
| 792,860 | Great Britain | Apr. 2, 1958 |

OTHER REFERENCES

Deluchat: Chem. Abstracts 28 (1934), 3062.

Migrdichian: "Organic Synthesis," volume II Reinhold Publishing Corporation, 1957, pages 1534-5 relied on.